(12) United States Patent
Jeon et al.

(10) Patent No.: US 7,688,697 B2
(45) Date of Patent: Mar. 30, 2010

(54) HIGH-DENSITY OPTICAL DISC AND RECORDING/REPRODUCING METHOD THEREOF

(75) Inventors: Ik Beom Jeon, Seoul (KR); Sang Woon Suh, Seoul (KR)

(73) Assignee: LG Electronics, Inc., Seoul (KR)

(*) Notice: Subject to any disclaimer, the term of this patent is extended or adjusted under 35 U.S.C. 154(b) by 739 days.

(21) Appl. No.: 10/645,566

(22) Filed: Aug. 22, 2003

(65) Prior Publication Data

US 2005/0099916 A1 May 12, 2005

(30) Foreign Application Priority Data

Aug. 22, 2002 (KR) .................. 10-2002-0049637
Oct. 14, 2002 (KR) .................. 10-2002-0062522

(51) Int. Cl.
*G11B 7/007* (2006.01)
*G11B 7/004* (2006.01)

(52) U.S. Cl. ............... 369/59.25; 369/47.47; 369/275.3

(58) Field of Classification Search ........... 369/52.1, 369/53.22, 47.15, 47.35, 59.25, 94, 275.1–275.5
See application file for complete search history.

(56) References Cited

U.S. PATENT DOCUMENTS

| | | | | |
|---|---|---|---|---|
| 4,972,399 A * | 11/1990 | Miyasaka | ............... | 369/53.22 |
| 5,124,962 A * | 6/1992 | Haneji | ............... | 369/53.29 |
| 5,341,356 A * | 8/1994 | Dieleman et al. | ......... | 369/53.24 |
| 6,081,785 A * | 6/2000 | Oshima et al. | ............... | 705/1 |
| 6,118,927 A | 9/2000 | Kikuchi et al. | | |
| 6,208,603 B1 * | 3/2001 | Ishida et al. | ............... | 369/275.3 |
| 6,278,671 B1 | 8/2001 | Gotoh et al. | | |
| 6,377,526 B1 * | 4/2002 | Vining et al. | ............... | 369/53.2 |
| 6,414,920 B1 * | 7/2002 | Lee | ............... | 369/47.31 |
| 6,594,794 B1 | 7/2003 | De Marzi et al. | | |

(Continued)

FOREIGN PATENT DOCUMENTS

CN 1224890 8/1999

(Continued)

OTHER PUBLICATIONS

Machine translation of JP 2003196843 A.*

(Continued)

*Primary Examiner*—Andrea L Wellington
*Assistant Examiner*—Nathan Danielsen
(74) *Attorney, Agent, or Firm*—Harness, Dickey & Pierce, P.L.C.

(57) ABSTRACT

A high-density optical disc such as BD-RE (Blu-ray Disc Rewritable) or BD-ROM, and a recording/reproducing method thereof are disclosed. Diverse additional information such as disc reflectivity information, disc layer information or disc type information is efficiently recorded in a particular information field included in a data unit recorded on the burst cutting area of a high-density optical disc or a particular 1-byte address field included in an address unit recorded on the high-density optical disc so that it can be read when the high-density optical disc is loaded in an optical disc apparatus or when a data recording or reproducing operation for the high-density optical disc is carried out. Accordingly, it is possible to achieve optimal optical power control and automatic gain control or identification of a current position, while enabling a normal data recording or reproducing operation corresponding to the type of the optical disc.

38 Claims, 10 Drawing Sheets

U.S. PATENT DOCUMENTS

| | | | |
|---|---|---|---|
| 6,608,804 | B2 | 8/2003 | Shim |
| 6,938,162 | B1* | 8/2005 | Nagai et al. ............... 713/189 |
| 6,992,959 | B1* | 1/2006 | Tosaki et al. ............ 369/53.21 |
| 7,304,937 | B1* | 12/2007 | Xie .......................... 369/272.1 |
| 2001/0007545 | A1* | 7/2001 | Ueda et al. ............... 369/53.21 |
| 2002/0060968 | A1* | 5/2002 | Senshu .................... 369/59.25 |
| 2002/0085466 | A1* | 7/2002 | Shim ........................ 369/275.3 |
| 2002/0191510 | A1 | 12/2002 | Senshu |
| 2003/0016603 | A1* | 1/2003 | Tomita .................... 369/53.22 |
| 2003/0185128 | A1 | 10/2003 | Shoji et al. |
| 2004/0156294 | A1* | 8/2004 | Watanabe et al. ............. 369/94 |

FOREIGN PATENT DOCUMENTS

| | | |
|---|---|---|
| EP | 0 997 904 A1 | 5/2000 |
| EP | 1 115 117 | 7/2001 |
| EP | 1 178 471 | 2/2002 |
| EP | 1 191 531 | 3/2002 |
| EP | 1 365 392 | 11/2003 |
| EP | 1 115 117 | 10/2005 |
| GB | 2 332 977 | 7/1999 |
| GB | 2332977 A | 7/1999 |
| JP | 61-208676 | 9/1986 |
| JP | 04-232664 | 8/1992 |
| JP | 04-283474 | 10/1992 |
| JP | 05-282795 | 10/1993 |
| JP | 08-212716 | 8/1996 |
| JP | 09-282808 | 10/1997 |
| JP | 10-097765 | 4/1998 |
| JP | 10-106161 | 4/1998 |
| JP | 10-188361 | 7/1998 |
| JP | 10-334605 | 12/1998 |
| JP | 11-045461 | 2/1999 |
| JP | 11-102576 | 4/1999 |
| JP | 11-213532 | 8/1999 |
| JP | 11-296862 | 10/1999 |
| JP | 11-338956 | 12/1999 |
| JP | 2000-078519 | 3/2000 |
| JP | 2000-132903 | 5/2000 |
| JP | 2001-229542 | 8/2001 |
| JP | 2001-229545 | 8/2001 |
| JP | 2001-243636 | 9/2001 |
| JP | 2001-256655 | 9/2001 |
| JP | 2003-006997 | 1/2003 |
| JP | 2003-036543 | 2/2003 |
| JP | 2003196843 A * | 7/2003 |
| JP | 2001-229542 | 8/2004 |
| KR | 10-1999-0060372 | 7/1999 |
| KR | 10-2001-0007191 | 1/2001 |
| KR | 20010070430 | 7/2001 |
| KR | 10-2001-0095391 | 11/2001 |
| KR | 10-2002-0075508 | 10/2002 |
| KR | 10-2002-0087336 | 11/2002 |
| KR | 2003-0011603 | 2/2003 |
| KR | 10-0713093 | 4/2007 |
| WO | WO 0026912 A * | 5/2000 |
| WO | WO 01/11890 A1 | 2/2001 |
| WO | WO 02/086873 A1 | 10/2002 |
| WO | WO 02/086887 | 10/2002 |
| WO | WO 2004/066286 | 8/2004 |

OTHER PUBLICATIONS

Intel Corporation et al., "Content Protection for Recordable Media Specification," DVD Book, Revision 0.94, DVD Book, Oct. 18, 2000 (XP002167964).

International Search Report for corresponding PCT Application No. PCT/KR2004/000422 dated Jun. 23, 2004.

Office Action for corresponding Australian Patent Application No. 2004210554 dated Apr. 21, 2006.

Office Action for corresponding Russian Patent Application No. 2004137479/28 dated May 30, 2007.

Office Action for corresponding U.S. Appl. No. 10/787,159 dated Aug. 8, 2007.

Office Action for corresponding Australian Patent Application No. 2004210554 dated Sep. 3, 2007.

Office Action for corresponding Japanese Patent Application No. 2004-530648 dated Oct. 2, 2007.

Office Action for corresponding Chinese Patent Application No. 200480000152.6 dated Nov. 23, 2007.

Office Action for corresponding European Patent Application No. 04715572.6 dated Feb. 27, 2008.

Office Action for Japanese Patent Publication No. 2006-502723 dated Mar. 28, 2008.

Office Action for European patent application No. 04715572.6-2210 dated Jul. 4, 2008.

Office Action for corresponding Japanese patent application No. 2004-530648 dated Aug. 29, 2008.

Office Action for European patent application No. 03792867.8-2223 dated Sep. 17, 2008.

"Standard ECMA-267, $3^{rd}$ Edition: 120 mm DVD—Read-only Disk," Standard ECMA-267, ECMA: Standardizing Information and Communication Systems, Apr. 1, 2001, pp. 1-96.

Office Action for Korean patent application No. 10-2002-0062522 dated Apr. 9, 2009.

Office Action for Japanese patent application No. 2008-220318 dated Apr. 24, 2009 (with English translation).

Office Action for Japanese patent application No. 2006-502723 dated May 8, 2009 (with English translation).

Office Action for Korean patent application No. 10-2003-0012414 dated Jul. 22, 2009.

Notice of Allowance for Korean patent application No. 10-2002-0049637 dated Jul. 30, 2009.

Office Action for Japanese patent application No. 2004-530648 dated Jul. 7, 2009 (with English translation).

Office Action for European patent application No. 03792867.8 dated Jul. 27, 2009.

Office Action for Canadian patent application No. 2 505 912 dated Aug. 18, 2009.

Office Action for Canadian patent application No. 2 464 221 dated Aug. 18, 2009.

"120 mm DVD Rewritable Disk (DVD-RAM)," ECMA-272, Jun. 1999, URL: http://www.ecma-international.org/publications/standards/Standard.htm, date last accessed: Aug. 3, 2009.

Office Action for Japanese patent application No. 2008-220318 dated Jan. 8, 2010 with English translation.

* cited by examiner

Data structure of BCA-code

← 1 Bytes → ← 4 Bytes →

| | | | | | |
|---|---|---|---|---|---|
| $SB_{3,3}$ | BCA pre-amble (all 00h) | | | | 1 row |
| $SB_{0,0}$ | $I_{0,0}$ | $I_{1,0}$ | $I_{2,0}$ | $I_{3,0}$ | 4 rows data |
| $SB_{0,0}$ | $I_{4,0}$ | $I_{5,0}$ | $I_{6,0}$ | $I_{7,0}$ | |
| $SB_{0,0}$ | $I_{8,0}$ | $I_{9,0}$ | $I_{10,0}$ | $I_{11,0}$ | |
| $SB_{0,0}$ | $I_{12,0}$ | $I_{13,0}$ | $I_{14,0}$ | $I_{15,0}$ | |
| $SB_{0,1}$ | $C_{0,0}$ | $C_{1,0}$ | $C_{2,0}$ | $C_{3,0}$ | 4 rows parity |
| $SB_{0,1}$ | $C_{4,0}$ | $C_{5,0}$ | $C_{6,0}$ | $C_{7,0}$ | |
| $SB_{0,1}$ | $C_{8,0}$ | $C_{9,0}$ | $C_{10,0}$ | $C_{11,0}$ | |
| $SB_{0,1}$ | $C_{12,0}$ | $C_{13,0}$ | $C_{14,0}$ | $C_{15,0}$ | |
| $SB_{0,2}$ | $I_{0,1}$ | $I_{1,1}$ | $I_{2,1}$ | $I_{3,1}$ | 4 rows data |
| $SB_{0,2}$ | $I_{4,1}$ | $I_{5,1}$ | $I_{6,1}$ | $I_{7,1}$ | |
| $SB_{0,2}$ | $I_{8,1}$ | $I_{9,1}$ | $I_{10,1}$ | $I_{11,1}$ | |
| $SB_{0,2}$ | $I_{12,1}$ | $I_{13,1}$ | $I_{14,1}$ | $I_{15,1}$ | |
| $SB_{0,3}$ | $C_{0,1}$ | $C_{1,1}$ | $C_{2,1}$ | $C_{3,1}$ | 4 rows parity |
| $SB_{0,3}$ | $C_{4,1}$ | $C_{5,1}$ | $C_{6,1}$ | $C_{7,1}$ | |
| $SB_{0,3}$ | $C_{8,1}$ | $C_{9,1}$ | $C_{10,1}$ | $C_{11,1}$ | |
| $SB_{0,3}$ | $C_{12,1}$ | $C_{13,1}$ | $C_{14,1}$ | $C_{15,1}$ | |
| $SB_{0,4}$ | $I_{0,2}$ | $I_{1,2}$ | $I_{2,2}$ | $I_{3,2}$ | 4 rows data |
| $SB_{0,4}$ | $I_{4,2}$ | $I_{5,2}$ | $I_{6,2}$ | $I_{7,2}$ | |
| $SB_{0,4}$ | $I_{8,2}$ | $I_{9,2}$ | $I_{10,2}$ | $I_{11,2}$ | |
| $SB_{0,4}$ | $I_{12,2}$ | $I_{13,2}$ | $I_{14,2}$ | $I_{15,2}$ | |
| $SB_{0,5}$ | $C_{0,2}$ | $C_{1,2}$ | $C_{2,2}$ | $C_{3,2}$ | 4 rows parity |
| $SB_{0,5}$ | $C_{4,2}$ | $C_{5,2}$ | $C_{6,2}$ | $C_{7,2}$ | |
| $SB_{0,5}$ | $C_{8,2}$ | $C_{9,2}$ | $C_{10,2}$ | $C_{11,2}$ | |
| $SB_{0,5}$ | $C_{12,2}$ | $C_{13,2}$ | $C_{14,2}$ | $C_{15,2}$ | |
| $SB_{0,6}$ | $I_{0,3}$ | $I_{1,3}$ | $I_{2,3}$ | $I_{3,3}$ | 4 rows data |
| $SB_{0,6}$ | $I_{4,3}$ | $I_{5,3}$ | $I_{6,3}$ | $I_{7,3}$ | |
| $SB_{0,6}$ | $I_{8,3}$ | $I_{9,3}$ | $I_{10,3}$ | $I_{11,3}$ | |
| $SB_{0,6}$ | $I_{12,3}$ | $I_{13,3}$ | $I_{14,3}$ | $I_{15,3}$ | |
| $SB_{0,7}$ | $C_{0,3}$ | $C_{1,3}$ | $C_{2,3}$ | $C_{3,3}$ | 4 rows parity |
| $SB_{0,7}$ | $C_{4,3}$ | $C_{5,3}$ | $C_{6,3}$ | $C_{7,3}$ | |
| $SB_{0,7}$ | $C_{8,3}$ | $C_{9,3}$ | $C_{10,3}$ | $C_{11,3}$ | |
| $SB_{0,7}$ | $C_{12,3}$ | $C_{13,3}$ | $C_{14,3}$ | $C_{15,3}$ | |

(1 data unit spans each data+parity block pair)

*BD - Address Unit*

HIGH-DENSITY OPTICAL DISC AND RECORDING/REPRODUCING METHOD THEREOF

BACKGROUND OF THE INVENTION

1. Field of the Invention

The present invention relates to a high-density optical disc such as BD-RE (Blu-ray Disc Rewritable) or BD-ROM, and a recording/reproducing method thereof.

2. Description of the Related Art

Recently, high-density optical discs have been developed, for example, DVD (Digital Versatile Disc), which can store a large quantity of high-quality video and audio data. Currently, such high-density optical discs are widely commercially available.

Figure 1:
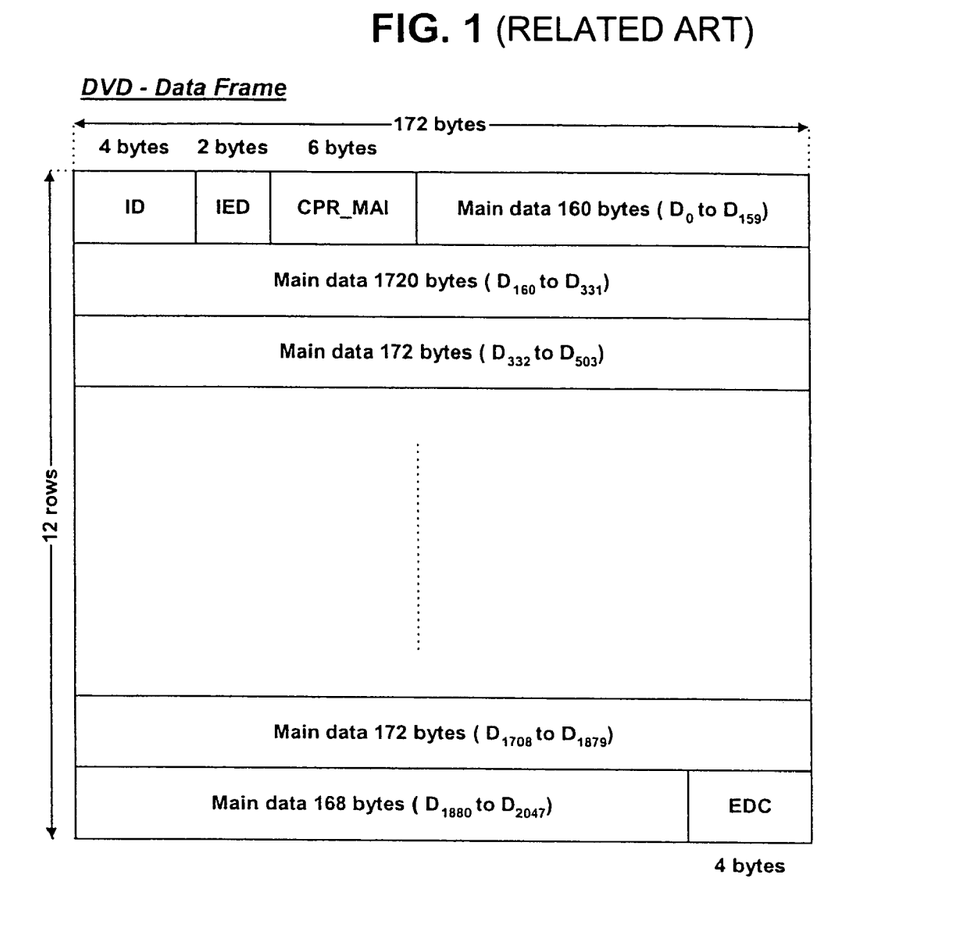
FIG. 1 is a schematic view illustrating the structure of a data frame in a general DVD.

On a DVD, main A/V data is recorded in the unit of sectors each having a size of 2,084 bytes, as shown in FIG. 1. In each sector of 2,048 bytes, additional information of 16 bytes is recorded which may include ID (Identification Data), IED (ID Error Detection Code), CPR_MAI (Copyright Management Information), and EDC (Error Detection Code).

Figure 2:
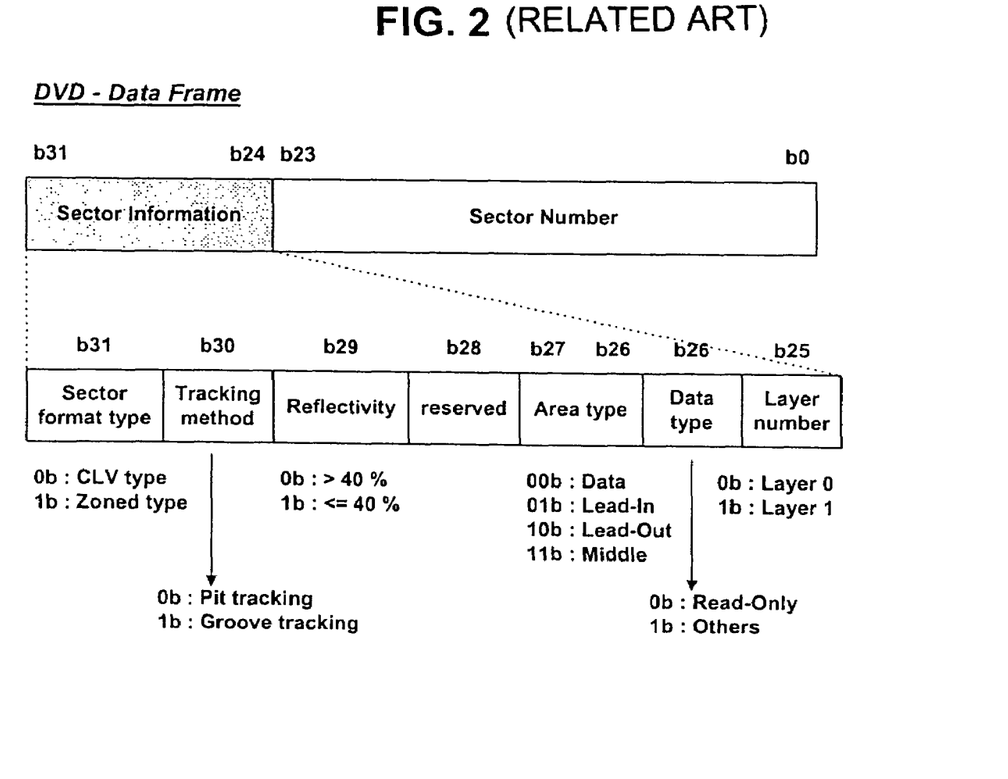
FIG. 2 is a schematic view illustrating the structure of sector information in a general DVD.

The sector ID information, which is included in the additional information, consists of 4 bytes including 1-byte sector information and 3-byte sector number information, as shown in FIG. 2.

The 1-byte sector information includes sector format type information, tracking method information, disc reflectivity information, reserved information, data type information, and layer number information, each of which has a size of 1 bit. The sector information also includes area type information of 2 bits.

For example, where the sector formation type information corresponds to '0b', it represents that the main A/V data recorded on the associated sector can be reproduced or recorded by a CLV (Constant Linear Velocity) type. On the other hand, where the sector formation type information corresponds to '1b', it represents that the main A/V data recorded on the associated sector can be reproduced or recorded by different types for different zones, respectively.

Also, where the tracking method information corresponds to '0b', it represents a pit-based tracking operation. On the other hand, where the tracking method information corresponds to '1b', it represents a groove-based tracking operation. Where the disc reflectivity information corresponds to '0b', it represents a reflectivity of more than 40%. On the other hand, where the reflectivity information corresponds to '1b', it represents a reflectivity of not more than 40%.

Meanwhile, where the area type information corresponds to '00b', it represents that the current position corresponds to a data area. Also, where the area type information corresponds to '01b', it represents that the current position corresponds to a lead-in area. The area type information corresponding to '01b' represents a lead-out area, whereas the area type information corresponding to '11b' represents a middle area on a dual layer optical disc. Where the data type information corresponds to '0b', it represents that the main A/V data of the associated sector is read-only data. On the other hand, where the data type information corresponds to '1b', it represents that the main A/V data of the associated sector is data other than read-only data.

Also, where the layer number information corresponds to '0b', it represents that the current disc has a single layer or that the current layer is a first layer Layer 0 in a dual layer optical disc. On the other hand, where the layer number information corresponds to '1b', it represents that the current layer is a second layer Layer 1 in the dual layer optical disc.

Accordingly, once such a DVD is loaded in an optical disc apparatus, the optical disc apparatus reads sector format type information, tracking method information, disc reflectivity information, data type information, layer number information, and area type information recorded on the DVD as sector information, in order to normally carry out a data recording or reproducing operation corresponding to the read information.

For example, servo control for data recording or reproduction should be determined in accordance with whether the sector formation type information represents a CLV type or a different type having different linear velocities for respective zones. Also, the gain of a read signal should be determined in accordance with the disc reflectivity information. Focus servo control also has to be determined in accordance with the layer information. Thus, the recording or reproducing condition should be determined in accordance with the additional information.

Meanwhile, standardization of new high-density optical discs such as BD-RE and BD-ROM has recently been conducted by associated companies. However, the data format of such BDs is essentially different from that of DVDs. Furthermore, there is no method for effectively and appropriately recording diverse information corresponding to sector information, as recorded on a DVD, on the above mentioned high-density optical disc. Accordingly, such a method is strongly demanded.

SUMMARY OF THE INVENTION

The present invention has been made in view of the above-mentioned problems, and an object of the invention is to provide a high-density optical disc such as BD-RE or BD-ROM and a recording or reproducing method thereof in which diverse additional information corresponding to sector information, as used in a DVD, is efficiently recorded in a particular information field included in a data unit recorded on a burst cutting area of the high-density optical disc or a particular 1-byte address field included in an address unit recorded on the high-density optical disc so that it can be read when the high-density optical disc is loaded in an optical disc apparatus or when a data recording or reproducing operation for the high-density optical disc is carried out.

In accordance with one aspect, the present invention provides a high-density recording medium, comprising: a burst cutting area; and a data area including an address unit, wherein additional information is recorded on at least one of the burst cutting area and the address unit, while the additional information being used to control a recording or reproduction of the recording medium.

In accordance with another aspect, the present invention provides a recording/reproducing method for a high-density optical disc, comprising the steps of: identifying information recorded in a particular information field included in a data unit read from a burst cutting area of the optical disc or in a particular address field included in an address unit read from the optical disc; and controlling a data recording or reproducing operation, based on the identified information.

BRIEF DESCRIPTION OF THE DRAWINGS

The above objects, and other features and advantages of the present invention will become more apparent after reading the following detailed description when taken in conjunction with the drawings, in which.

DETAILED DESCRIPTION OF PREFERRED EMBODIMENTS

Hereinafter, preferred embodiments of a high-density optical disc and a recording/reproducing method thereof according to the present invention will be described in detail with reference to the annexed drawings.

The high-density optical disc according to the present invention may be either a BD-RE or a BD-ROM.

In accordance with a first embodiment of the present invention, diverse additional information required to enable a normal data recording or reproducing operation may be recorded on a burst cutting area (BCA) assigned to the high-density optical disc.

Figure 3:
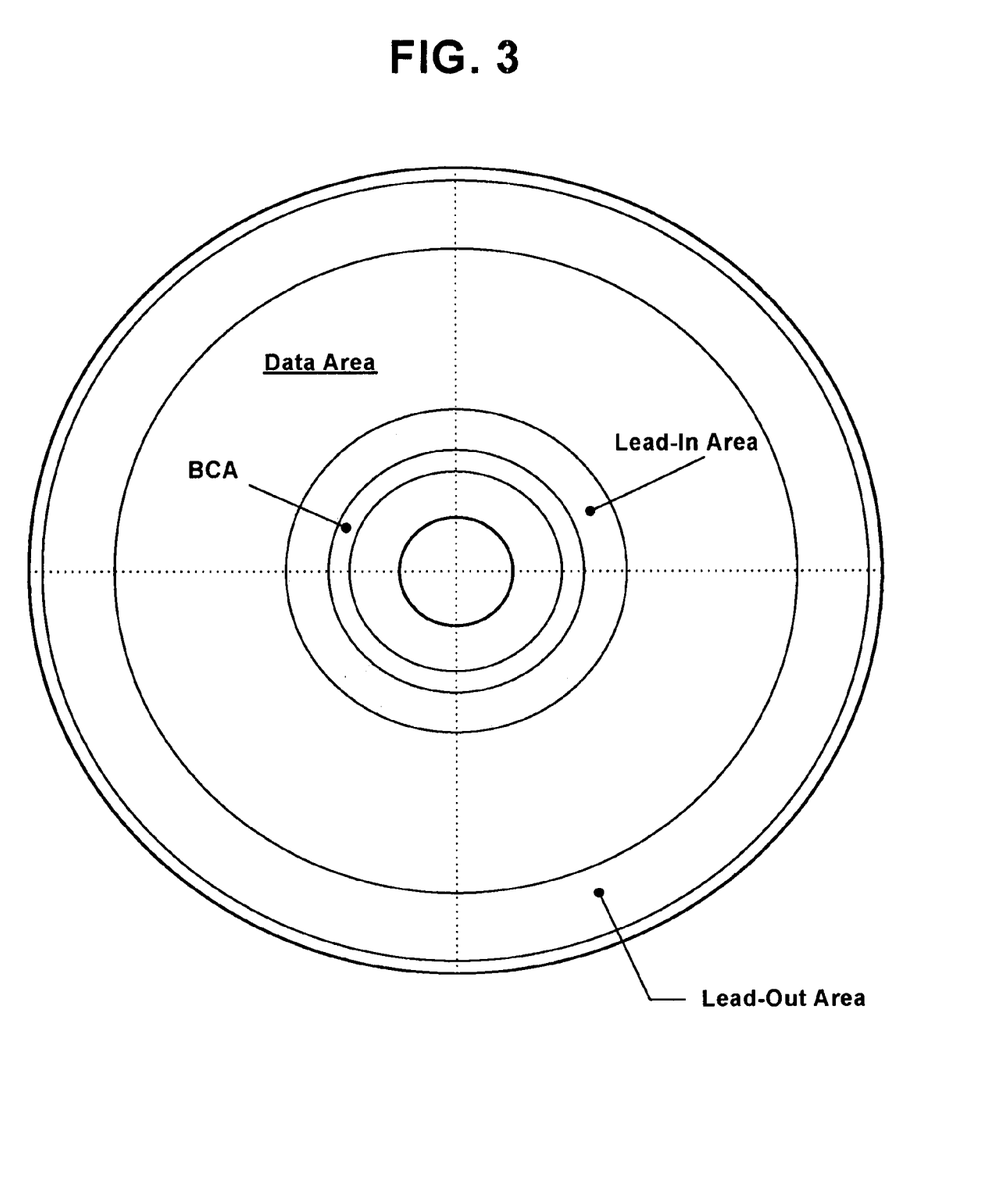
FIG. 3 is a schematic view illustrating a BCA on a high-density optical disc according to the present invention.

The BCA, which is assigned to the high-density optical disc, as shown in FIG. 3, is an innermost area that the optical disc apparatus first accesses when the high-density optical disc is loaded therein. On the BCA, diverse information such as enciphering information for anti-duplication of the disc is recorded in the form of a BCA code.

Figure 4:
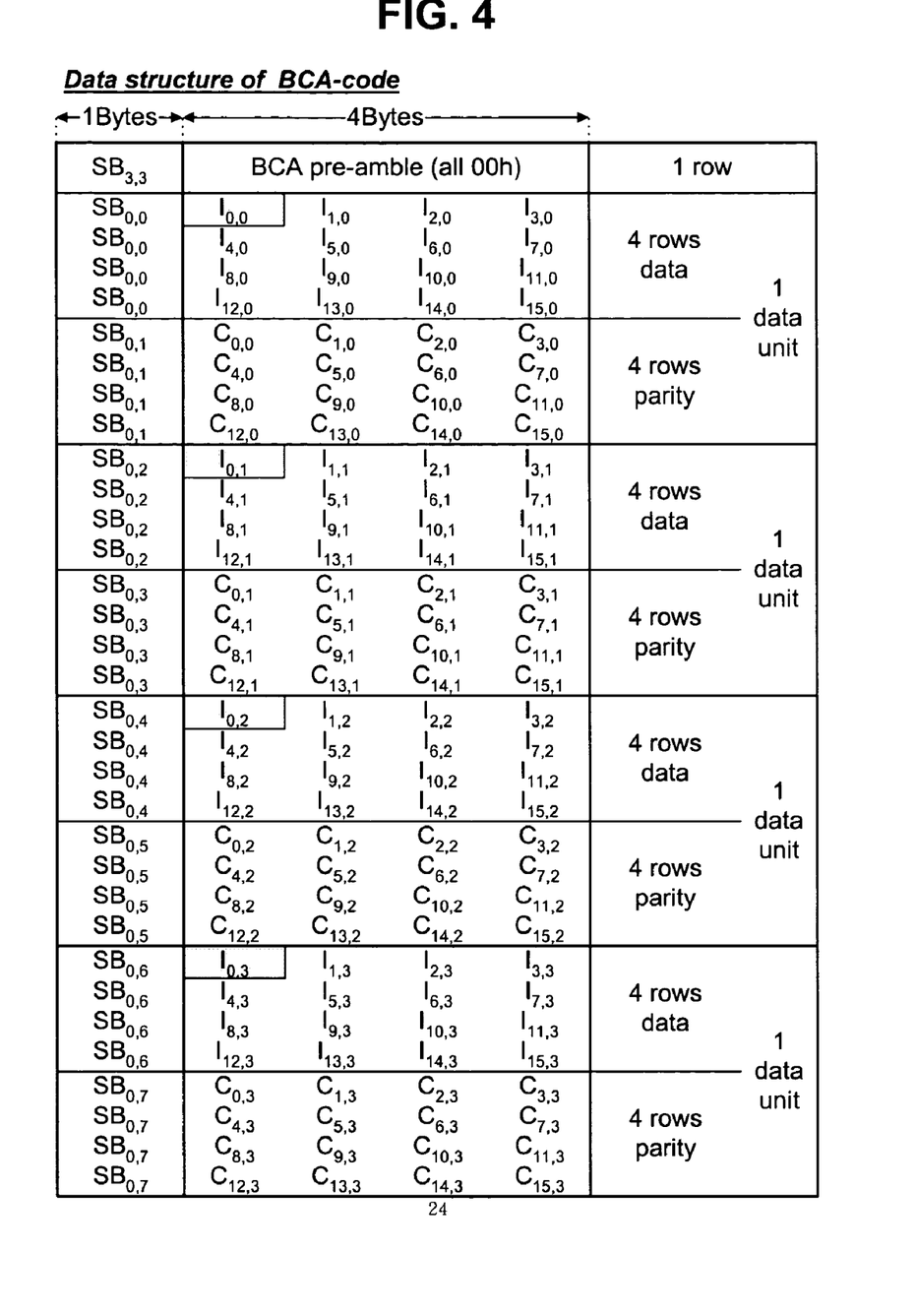
FIG. 4 is a schematic view illustrating the structure of data units on a high-density optical disc according to an embodiment of the present invention.

As shown in FIG. 4, the BCA code recorded on the BCA has a data structure in which a plurality of data units are successively recorded. Each data unit consists of data of 4 rows including a sync field of 1 byte and an information field of 4 bytes, and parity of 4 rows including a sync field of 1 byte and a carrier field of 4 bytes.

Figure 5:
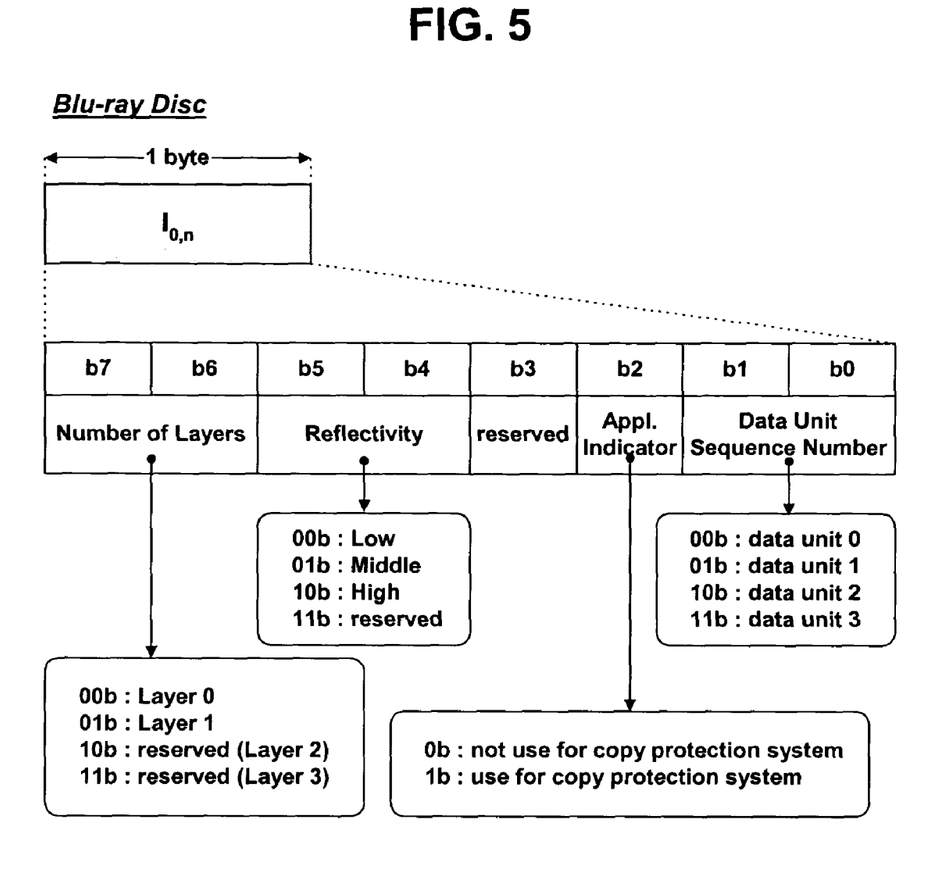
FIG. 5 is a schematic view illustrating one exemplary structure of a particular information field on the high-density optical disc according to the first embodiment of the present invention.

Meanwhile, diverse additional information corresponding to sector information, as used in DVDs and described with reference to FIG. 2, may be recorded in an optional information field in each data unit, for example, a first information field of each data unit, $I_{0,0}$ $I_{0,1}$, $I_{0,2}$, or $I_{0,3}$. For example, recorded in the first information field $I_{0,0}$, of each data unit written on the BCA of a BD-ROM may be number-of-layers information of 2 bits (b7b6=Number of Layers), disc reflectivity information of 2 bits (b5b4=Reflectivity), reserved information of 1 bit (b3=reserved), application indicator information of 1 bit (b2=Application Indicator), and data unit sequence number information of 2 bits (b1b0=Data Unit Sequence Number), as shown in FIG. 5.

In this case, where the 2-bit number-of-layers information 'b7b6' corresponds to '00b', it represents that the associated optical disc has a structure consisting of one layer, that is, a single layer structure. Also, the number-of-layers information 'b7b6' corresponding to '01b' represents that the associated optical disc has a dual layer structure. On the other hand, where the number-of-layers information 'b7b6' corresponds to '10b' or '11b', it represents that the associated optical disc has a triple layer structure having a third layer Layer 2 or a quadruple layer structure having a fourth layer Layer 3.

Where the 2-bit reflectivity information 'b5b4' corresponds to '00b', it represents that the optical disc has a low reflectivity lower than a first predetermined reference value. Also, the reflectivity information 'b5b4' corresponding to '01b' represents that the optical disc has a middle reflectivity being higher than the first predetermined reference value and lower than a second predetermined reference value, whereas the reflectivity information 'b5b4' corresponding to '11b' represents that the optical disc has a high reflectivity higher than the second predetermined reference value.

For reference, the recording density of a BD-RE or BD-ROM is about 5 times as high as that of general DVDs. By virtue of such a high recording density, it is possible to allocate 2 bits to reflectivity information in the case of the BD-RE or BD-ROM, so that the reflectivity information can be more finely defined. Accordingly, more appropriate OPC (Optical Power Control) and AGC (Automatic Gain Control) can be carried out during data recording and reproducing operations.

Where the 1-bit application indicator information 'b2' corresponds to '0b', it represents nonuse of an anti-duplication system. On the other hand, the application indicator information 'b2' corresponding to '1b' represents use of the anti-duplication system.

Also, where the 2-bit data unit sequence number information 'b1b0' corresponds to '00b', it represents that the number of the associated data unit is 'Data Unit 0'. The data unit sequence number information 'b1b0' corresponding to '01b' represents 'Data Unit 1', whereas the data unit sequence number information 'b1b0' corresponding to '01b' represents 'Data Unit 2'. On the other hand, the data unit sequence number information 'b1b0' corresponding to '11b' represents 'Data Unit 3'.

In addition to the above-described information, regional playback control information (not shown) may be recorded. Optical discs recorded with such regional playback control information cannot be played back in a particular optical recording/reproducing apparatus.

Figure 6:
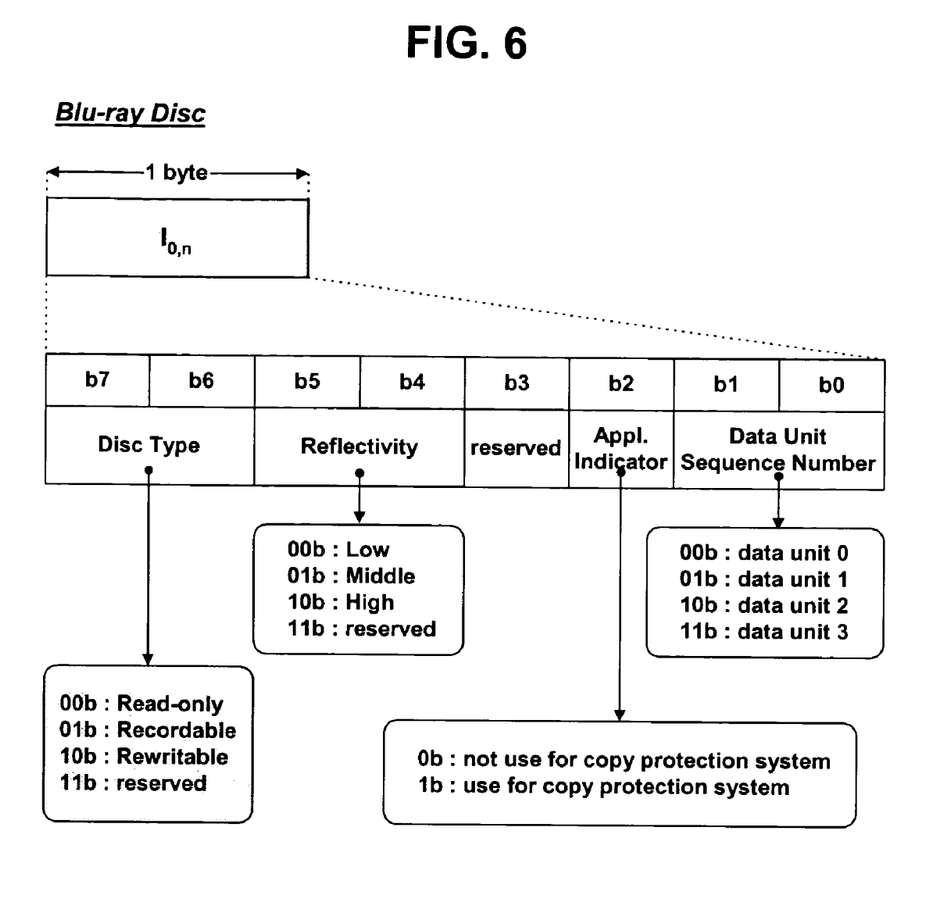
FIG. 6 is a schematic view illustrating another exemplary structure of a particular information field on the high-density optical disc according to the first embodiment of the present invention.

Meanwhile, the 2-bit layer information may be substituted with disc type information, as shown in FIG. 6. For example, where the disc type information 'b7b6' corresponds to '00b', it represents a BD-ROM type. Also, the disc type information 'b7b6' corresponding to '01b' represents a BD-R (Blu-ray Disc Recordable), whereas the disc type information 'b7b6' corresponding to '10b' represents a BD-RE.

Also, diverse additional information corresponding to sector information, as used in DVDs, may be repeatedly recorded in the remaining information fields $I_{n,1}$ to $I_{n,15}$ (n=0, 1, 2, 3) of each data unit, in order to stably read the additional information.

In accordance with a second embodiment of the present invention, diverse additional information required to enable a normal data recording or reproducing operation may also be recorded in an address unit written on the high-density optical disc.

Figure 7:
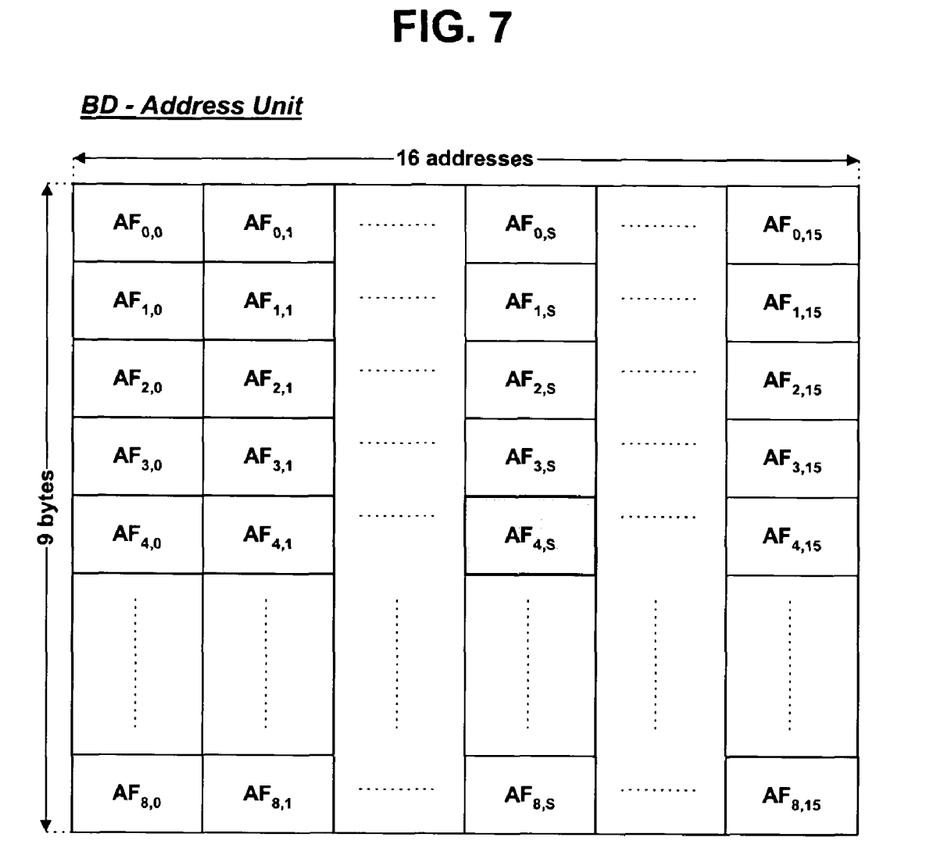
FIG. 7 is a schematic view illustrating the structure of an address unit on a high-density optical disc according to a second embodiment of the present invention.

As shown in FIG. 7, an address unit having a size of 16 addresses×9 bytes (rows) is recorded on the high-density optical disc. Meanwhile, diverse additional information corresponding to sector information, as used in a DVD and described above in conjunction with FIG. 2, is recorded in a particular 1-byte address field of the address unit, for example, an address field corresponding to a row number of '4' and an address number of 'S', $AF_{4,S}$ (S=0, 1, ..., 15).

Figure 8:
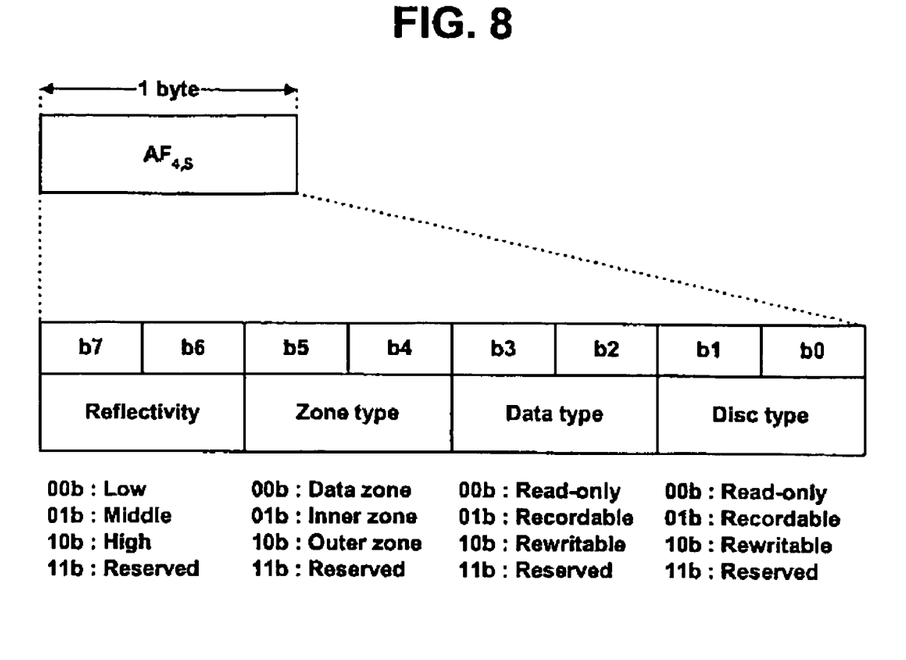
FIG. 8 is a schematic view illustrating the structure of a particular address field on the high-density optical disc according to the second embodiment of the present invention.

As shown in FIG. 8, the additional information recorded in the address field $AF_{4,S}$ may be disc reflectivity information, zone type information, data type information, and disc type information, each of which has a size of 2 bits. Here, the disc reflectivity information and disc type information are the same as those described above.

Where the zone type information corresponds to '00b', it represents that the current position corresponds to a data zone. The zone type information corresponding to '01b' represents an inner zone, whereas the zone type information corresponding to '01b' represents an outer zone. The zone type information is linked to the layer number information recorded in a state of being included in a physical ADIP address.

For example, where the zone type information corresponds to '01b' representing an inner zone under the condition in which the current layer is determined to be the first layer of a dual layer structure, based on the layer number information, the current position corresponds to the lead-in zone of the first layer. On the other hand, where the zone type information corresponds to '01b' representing an inner zone under the condition in which the current layer is determined to be the second layer of a dual layer structure, the current position corresponds to the lead-out zone of the second layer.

Meanwhile, where the data type information corresponds to '00b', it represents that the associated main A/V data is read-only data. Also, the data type information corresponding to '01b' represents recordable data, whereas the data type information corresponding to '10b' represents rewritable data.

Also, where the disc type information corresponds to '00b', it represents that the associated optical disc is a BD-ROM. On the other hand, the disc type information corresponding to '01b' represents a BD-R, whereas the disc type information corresponding to '10b' represents a BD-RE.

Figure 9:
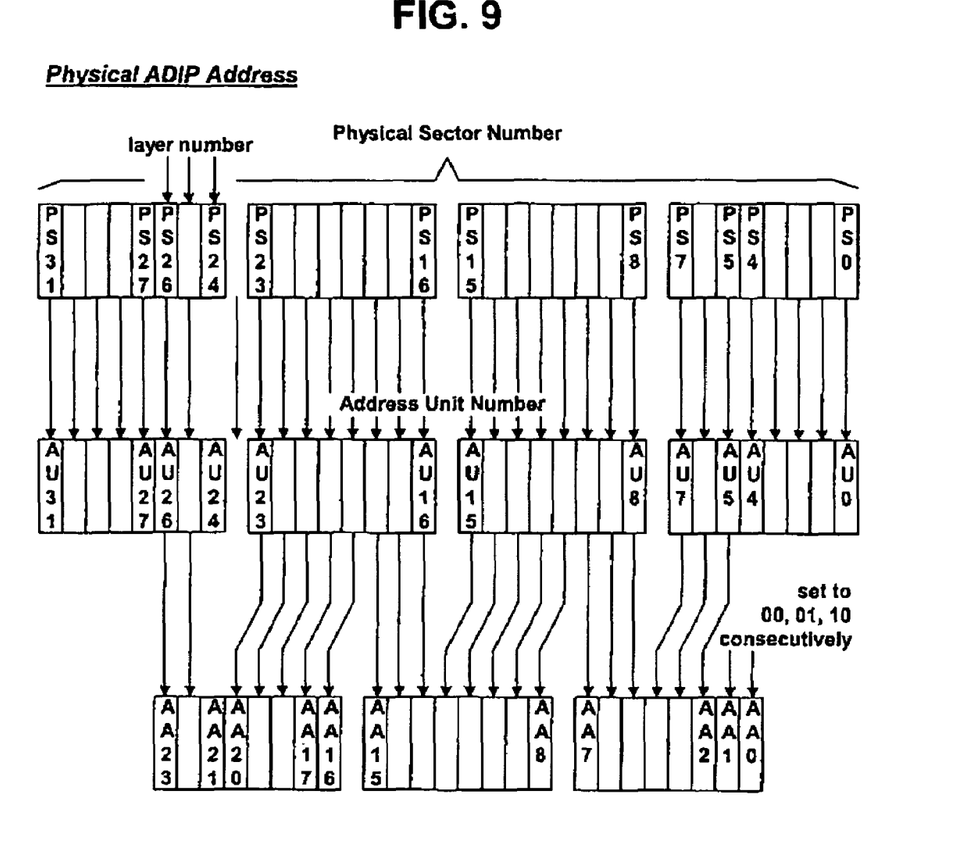
FIG. 9 is a schematic view illustrating the structure of a physical ADIP (Address In Pre-groove) address on the high-density optical disc according to the first or second embodiment of the present invention.

Meanwhile, layer information of 2 bits representing the current layer may be recorded in place of the data type information, in addition to the layer number information recorded in a state of being included in a physical ADIP address. Where the layer information corresponds to '00b', it represents that the current layer is a first layer Layer 0. Also, the layer information corresponding to '01b' represents a second layer Layer 1, whereas the layer information corresponding to '10b' represents a third layer Layer 2. On the other hand, the layer information corresponding to '11b' represents a fourth layer Layer 3. Alternatively, the layer information may represent the number of layers included in the associated disc.

It is also possible to perform desired control operations when a recording or reproducing operation is carried out, using the additional information according to the present invention in a state of being linked to the layer information. For example, although the layers of a high-density optical disc maybe different from one another in terms of tracking control method, disc reflectivity, and data type, it is possible to carry out a stable recording or reproducing operation by performing a control operation by the unit of layers, based on the additional information.

Figure 10:
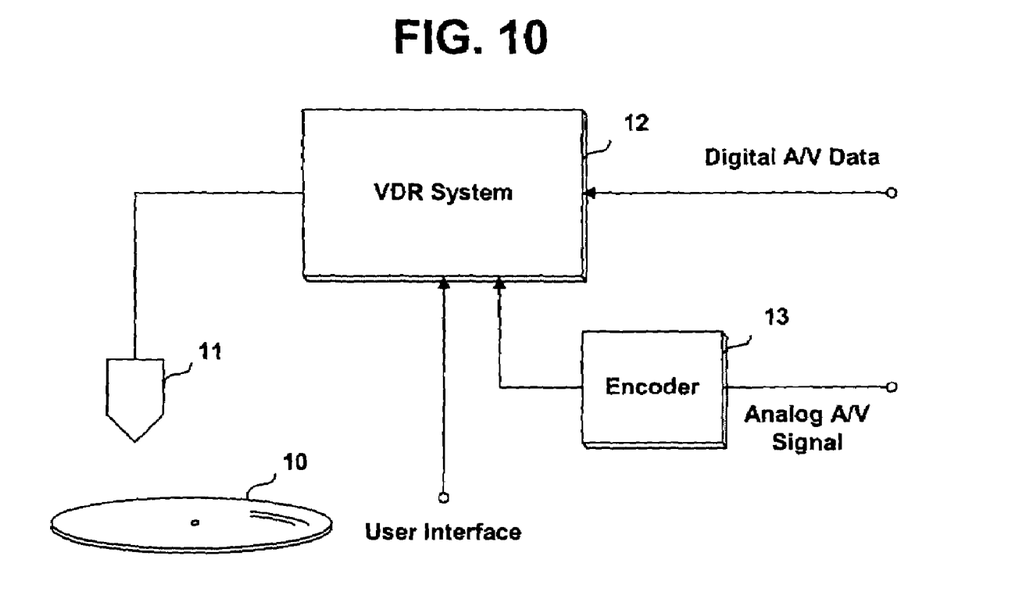
FIG. 10 is a schematic block diagram illustrating the configuration of an optical disc apparatus for recording data on the high-density optical disc or reproducing data recorded on the high-density optical disc according to the first or second embodiment of the present invention.

When a BD-RE or BD-ROM according to the first embodiment of the present invention is loaded in an optical disc apparatus including an optical pickup 11, a VDR (Video Disc Recording) system 12, and an encoder 13, as shown in FIG. 10, the optical disc apparatus preferentially accesses the BCA of the optical disc, and reads the reflectivity information recorded in the first information field of each data unit, thereby performing OPC and AGC operations. Also, the optical disc apparatus reads the layer information and disc type information recorded in the first information field of each data unit, so that it carries out a normal data recording or reproducing operation, based on the read information.

On the other hand, when a BD-RE or BD-ROM according to the second embodiment of the present invention is loaded in the optical disc apparatus, the optical disc apparatus reads the reflectivity information, zone type information, data type information and disc type information recorded in the address unit of the optical disc while performing a data recording or reproducing operation thereof, so that it normally carries out the data recording or reproducing operation, based on the read information.

Alternatively, the additional information according to the present invention may be recorded in a state of being included in file system data or navigation data recorded at the leading position of the data area on an optical disc. Where this method is combined with the method according to the first or second embodiment of the present invention, so as to record the additional information in both the leading position of the data area and the BCA or address unit, it is possible to perform a desired control operation using the information before and/or during the data recording or reproducing operation.

As apparent from the above description, the present invention provides a high-density optical disc and a recording/reproducing method thereof which enable optimal optical power control and automatic gain control or identification of a current position, while enabling a normal data recording or reproducing operation corresponding to the type of the optical disc.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A high-density recording medium including one or more recording layers, the recording medium comprising:
    a lead-in area including disc information required for recording or reproducing data on or from the recording medium; and
    a burst cutting area located at an inner area other than the lead-in area, the burst cutting area including a plurality of data units;
    wherein the disc information is included in the plurality of data units and the disc information includes medium type information that identifies a type of recording layer in the recording medium,
    each said data unit includes data of 4 rows and parity of 4 consecutive rows,
    each said data row has a sync field of 1 byte and an information field of 4 bytes, and each said parity row has a sync field of 1 byte and a parity field of 4 bytes, and
    the information field includes the medium type information indicating at least one of the following types: read-only, recordable, and rewritable.

2. The high-density recording medium according to claim 1, wherein the medium type information indicates that the recording medium is a writable medium or read-only medium.

3. The high-density recording medium according to claim 1, wherein each parity field is preceded by sync information.

4. The high-density recording medium according to claim 3, wherein the disc information is recorded in a first data unit.

5. The high-density recording medium according to claim 1, wherein the disc information further includes layer information.

6. The high-density recording medium according to claim 5, wherein the disc information further includes a sequence number to identify a data unit.

7. The high-density recording medium according to claim 6, wherein the disc information further includes an application indicator to indicate use of a copy protection system.

8. The high-density recording medium according to claim 5, wherein the layer information represents the number of layers included in the recording medium and is recorded in two bits.

9. The high-density recording medium according to claim 1, wherein the medium type information represents the type of a BD-ROM (BD-Read Only memory), a BD-R (BD-Recordable), or BD-RE (BD-Rewritable).

10. The high-density recording medium according to claim 1, wherein the data unit comprises a plurality of information bytes, the medium type information is included in at least one information byte.

11. A method for recording or reproducing data on or from a high-density recording medium including one or more recording layers, the method comprising:
    identifying disc information recorded in a burst cutting area and lead-in area of the recording medium, the information including medium type information that identifies a type of recording layer in the recording medium; and
    controlling a data recording or reproducing operation, based on the identified information wherein the burst cutting area includes a plurality of data units,
    wherein the disc information is included in the plurality of data units,
    each said data unit includes data of 4 rows and parity of 4 consecutive rows,
    each said data row has a sync field of 1 byte and an information field of 4 bytes,
    each said parity row has a sync field of 1 byte and a parity field of 4 bytes, and
    the information field includes the medium type information indicating at least one of the following types: read-only, recordable, and rewritable.

12. The method according to claim 11, wherein the disc information further includes layer information to indicate the number of layers included in the recording medium, thereby identifying the number of layers of the recording medium.

13. The method according to claim 11, wherein the medium type information represents the type of a BD-ROM (BD-Read Only memory), a BD-R (BD-Recordable), or BD-RE (BD-Rewritable).

14. The method according to claim 11, wherein the disc information includes reflectivity information of the recording medium recorded in two bits, the reflectivity information controlling an optical power or an automatic gain for a recording or reproducing operation.

15. The method according to claim 11, wherein the identifying step identifies the disc information preferentially when the recording medium is loaded in a recording or reproducing apparatus.

16. The method according to claim 11, wherein the identifying step identifies the disc information in an early stage of recording or reproducing data on or from the recording medium.

17. The method according to claim 11, wherein the disc information includes a sequence number to identify a data unit, thereby identifying the data unit that includes the disc information.

18. The method according to claim 11, wherein the method further comprises:
    moving an optical pickup to read data recorded on the burst cutting area; and
    processing the data recorded in the burst cutting area to identify the disc information.

19. The method according to claim 11, wherein the identifying step identifies the disc information at an early stage of a drive start-up procedure.

20. A method for recording or reproducing data on or from a high-density recording medium including one or more recording layers, the method comprising:
    reading disc information recorded in a burst cutting area and lead-in area of the recording medium, the burst cutting area being located at an inner area other than a lead-in area, the burst cutting area including a plurality of data units, the disc information being included in the plurality of data units and including medium type information that identifies a type of recording layer in the recording medium; and
    controlling a data recording or reproducing operation, based on the disc information, wherein each said data unit includes data of 4 rows and parity of 4 consecutive rows, each said data row has a sync field of 1 byte and an information field of 4 bytes, each said parity row has a sync field of 1 byte and a parity field of 4 bytes, and the information field includes the medium type information indicating at least one of the following types: read-only, recordable, and rewritable.

21. The method according to claim 20, wherein each data unit comprises a plurality of information bytes, the disc information being included in at least one of the information bytes of the data unit.

22. The method according to claim 20, wherein the disc information further includes layer information to indicate the number of layers included in the recording medium, thereby identifying the number of layers of the recording medium.

23. The method according to claim 22, further comprising:
    processing data included in at least one data unit to identify the disc information.

24. The method according to claim 23, wherein the processing step processes data included in each data unit to identify the disc information.

25. The method according to claim 20, wherein the medium type information represents the type of a BD-ROM (BD-Read Only memory), a BD-R (BD-Recordable), or a BD-RE (BD-Rewritable).

26. The method according to claim 20, wherein the disc information includes a sequence number to identify a data unit, thereby identifying the data unit that includes the disc information.

27. The method according to claim 20, wherein the reading step reads the disc information preferentially when the recording medium is loaded in a recording or reproducing apparatus.

28. The method according to claim 20, wherein the reading step reads the disc information in early stage for recording or reproducing data on or from the recording medium.

29. The method according to claim 20, wherein the reading step reads the disc information at early stage of drive start-up procedure.

30. The method according to claim 20, wherein the method further comprises:
   moving an optical pickup to first read data recorded on the burst cutting area; and
   processing the data recorded in the burst cutting area to identify the disc information.

31. An apparatus for recording or reproducing data on or from a high-density recording medium including one or more recording layers, the apparatus comprising:
   an optical pickup; and
   a controller operatively connected to the optical pickup and configured to identify disc information recorded in a burst cutting area and lead-in area of the recording medium, the information including medium type information that identifies a type of recording layer in the recording medium and control a data recording or reproducing operation, based on the identified information,
   wherein the burst cutting area includes a plurality of data units, the disc information is included in the plurality of the data units, each said data unit includes data of 4 rows and parity of 4 consecutive rows, each said data row has a sync field of 1 byte and an information field of 4 bytes, each said parity row has a sync field of 1 byte and a parity field of 4 bytes, and the information field includes the medium type information indicating at least one of the following types: read-only, recordable, and rewritable.

32. The apparatus of claim 31, wherein the disc information further includes layer information.

33. The apparatus of claim 32, wherein the layer information represents the number of layers included in the recording medium.

34. The apparatus of 33, wherein the disc information further includes an application indicator to indicate use of a copy protection system.

35. An apparatus for recording or reproducing data on or from a high-density recording medium including one or more recording layers comprising:
   an optical pickup; and
   a controller operatively connected to the optical pickup and configured to read, via the optical pickup, disc information recorded in a burst cutting area and lead-in area of the recording medium, the burst cutting area being located at an inner area other than a lead-in area, the burst cutting area including a plurality of data units,
   wherein the disc information is included in the plurality of data units and the disc information includes medium type information that identifies a type of recording layer in the recording medium,
   each said data unit includes data of 4 rows and parity of 4 consecutive rows,
   each said data row has a sync field of 1 byte and an information filed of 4 bytes
   each said parity row has a sync field of 1 byte and a parity field of 4 bytes, and
   the information field includes the medium type information indicating at least one of the following types: read-only, recordable, and rewritable.

36. The apparatus of claim 35, wherein the disc information further includes layer information.

37. The apparatus of claim 36, wherein the layer information represents the number of layers included in the recording medium.

38. The apparatus of claim 37, wherein the disc information further includes an application indicator to indicate use of a copy protection system.

* * * * *